United States Patent [19]
Porter et al.

[11] Patent Number: 5,451,849
[45] Date of Patent: Sep. 19, 1995

[54] MOTORIZED SELF-CORRECTING AUTOMATIC CONVERTIBLE TOP

[75] Inventors: Michael A. Porter, Southgate; Richard H. Kruse, Farmington Hills, both of Mich.; Samuel DiCesare, Glencoe; Kerry S. Berland, Chicago, both of Ill.; James M. Helms, Southgate; George A. Alderton, IV, Royal Oak, both of Mich.

[73] Assignee: ASC Incorporated, Southgate, Mich.

[21] Appl. No.: 87,194

[22] Filed: Jul. 2, 1993

Related U.S. Application Data

[63] Continuation-in-part of Ser. No. 817,299, Jan. 6, 1992, Pat. No. 5,225,747.

[51] Int. Cl.[6] .............................................. H02P 3/00
[52] U.S. Cl. ..................................... 318/466; 296/223; 318/434
[58] Field of Search ....................... 318/280–286, 318/268–272, 466–470, 434, 432; 49/26, 28, 29, 30, 43, 100, 118, 138; 160/1, 29, 47, 291, 292, 293.1, 310; 307/10.1; 296/210, 223, 207, 107, 219; 361/23, 31, 33

[56] References Cited

U.S. PATENT DOCUMENTS

| | | | |
|---|---|---|---|
| 3,716,945 | 2/1973 | Cooper et al. | 49/139 |
| 4,553,656 | 11/1985 | Lense | 49/139 X |
| 4,644,235 | 2/1987 | Ohta | 318/282 |
| 4,749,193 | 6/1988 | Hacker | 296/107 |
| 4,766,356 | 8/1988 | Handa et al. | 296/117 X |
| 5,018,784 | 5/1991 | Yokouchi et al. | 296/219 |
| 5,056,857 | 10/1991 | Ney et al. | 296/107 |
| 5,159,247 | 10/1992 | Resch | 318/466 X |
| 5,225,747 | 6/1993 | Helms et al. | 318/286 X |
| 5,242,210 | 9/1993 | Fujisawa et al. | 296/219 |
| 5,334,876 | 8/1994 | Washeleski et al. | 318/469 X |

*Primary Examiner*—Jonathan Wysocki
*Attorney, Agent, or Firm*—Harness, Dickey & Pierce

[57] ABSTRACT

This invention relates to a system and method for monitoring and controlling the operation of a motorized convertible top such that it may be extended and retracted automatically. The system and method of the present invention monitors the movement of the various components to provide fluid, simultaneous motion. It further detects and corrects improper alignments that may result in damage to the top due to overlapping elements or binding elements, and stores error information useful in diagnosing and repairing unrecoverable errors.

23 Claims, 4 Drawing Sheets

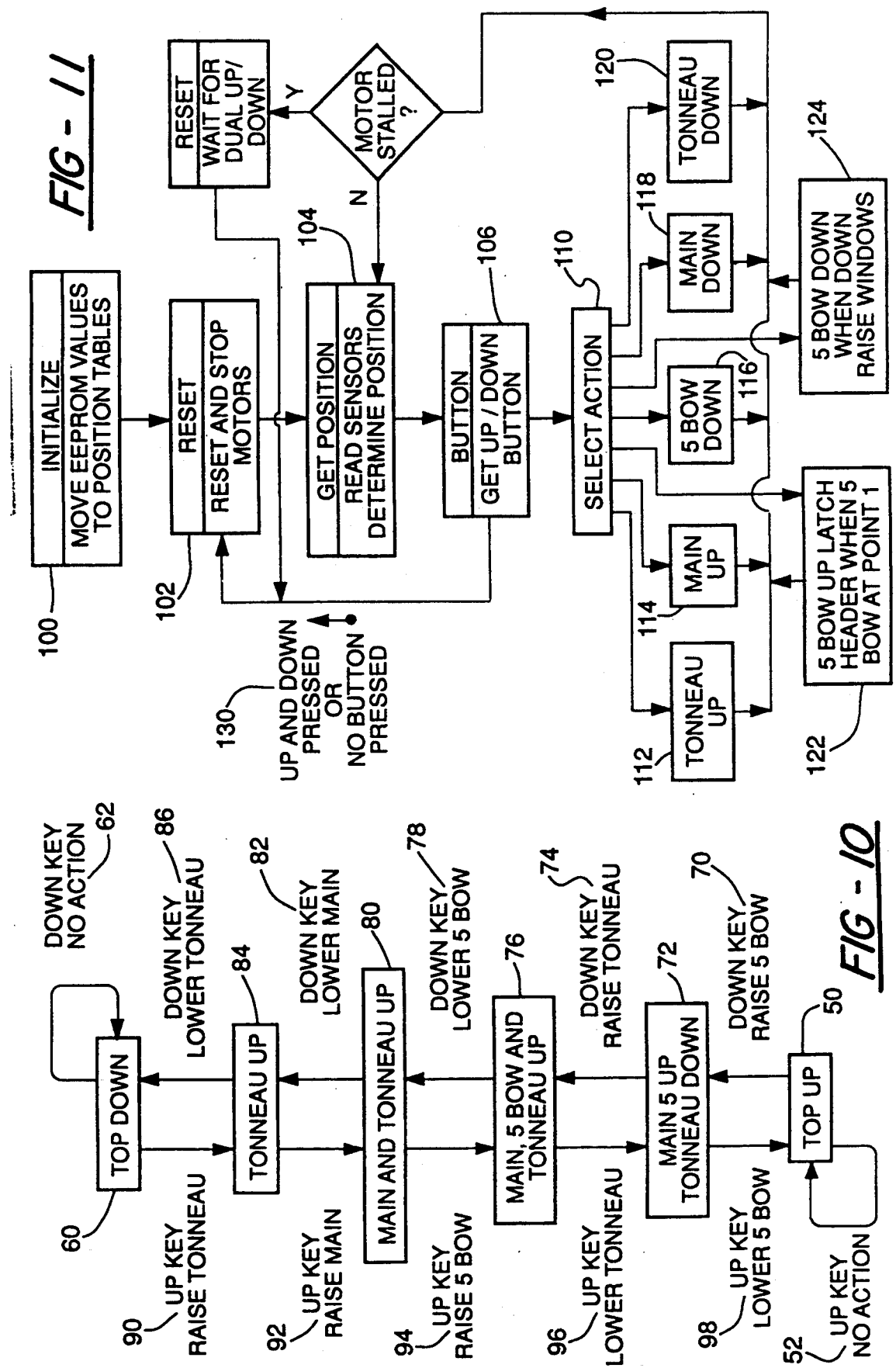

MOTORIZED SELF-CORRECTING AUTOMATIC CONVERTIBLE TOP

RELATED APPLICATIONS

This application is a continuation-in-part of Ser. No. 817299 now U.S. Pat. No. 5,225,747, filed Jan. 6, 1992, for "Single-Button Actuated Self-Correcting Automatic Convertible Top", by James A. Helms and George A. Alderton, IV and assigned to the present assignee.

BACKGROUND OF THE INVENTION

1. Technical Field

This invention relates generally to automobile convertible tops, and more particularly to an automobile convertible top that can be opened and closed automatically.

2. Description of the Related Art

In the field of automobile design, convertible tops have been employed to provide the consumer with versatile styling. Most people are familiar with manual convertible tops, which are latched and lowered by hand. However, over the years, many different types of automatic and semi-automatic convertible tops have been developed. Generally, these convertible tops utilize one or more motors to move the various linkages and other movable elements from an extended (or top closed) position to a retracted (top open) position. Through the aid of motorized movement, the user can raise and lower the convertible top more easily.

However, simply providing for motorized movement of the convertible top is not enough. For example, there are known motorized convertible tops that provide for limit sensors on the elements to determine whether the elements are in the "full retracted" or "full extended" position. However, such systems provide no information as to whether the linkage elements are simply near, rather than being at, one of the two fully articulated positions or not. As a result, these known systems, while being capable of causing the convertible top be opened and closed automatically, require each sensed element to reach an extreme position before commencing the movement of the next element in the sequence necessary to accomplish the desired movement of the convertible top. Thus, it would be advantageous if a motorized convertible top system could allow simultaneous movement of various elements so as to accomplish the opening and closing of the convertible top using a series of movements that are more fluid and continuous and that both reduce the time necessary to accomplish the movements as well as improving the aesthetic appearance of the movements.

Another disadvantage of known motorized convertible tops is the fact that the elements may bind as the movements are sequenced, increasing the load on the motors and risking damage to the motors or elements as the motors try to "force" the elements to move. Especially when trying to accomplish simultaneous movement of multiple elements, the fact that one element may be slightly inhibited in its movement means that the other moving elements will reach their desired position sooner than will the binding element. Allowed to continue uncorrected, this misalignment of elements can result in the convertible top being cocked in an undesirable position and may cause damage to the convertible top mechanism. Therefore, it would be desirable if there were some way to monitor the movement of critical elements while they are moving simultaneously so that remedial action can be taken in the event that a misalignment situation arises. The remedial action could include stopping the movement of other elements while the binding element is still moved, allowing the slower, binding element to "catch up" with the other elements. The remedial action could also include reversing the movement of some elements in order to realign the convertible top, and, once realignment is achieved, resuming normal movement of the elements. The remedial action could also detecting an unrecoverable misalignment and shutting down the motors before the motors are overburdened.

SUMMARY OF THE INVENTION

It is therefore an object of the present invention to provide a system and method for lowering and raising an automobile convertible top where motive means, such as electric motors, move the various structural elements of the convertible top. Sensors are associated with the convertible top's structural elements whereby the system determines the instantaneous position of the various structural elements as they are moved and commands further movement based upon the sensed positions of the elements. One advantage of the present invention is that the structural elements can be moved simultaneously to achieve a more fluid sequence of movements and to decrease the amount of time it takes to extend and retract the convertible top.

Another advantage is that, because the instantaneous positions of the various structural elements are being monitored, the system and method are capable of instituting remedial action in the event that the structural elements become misaligned during the sequence of movements. A further important feature of the presently preferred embodiment is that the monitoring of the convertible top's structural elements is accomplished through the use of only a few sensors, thereby simplifying the assembly of the system and reducing the cost associated therewith. Another feature of the presently preferred embodiment is that the system and method are capable of diagnosing failures within the system, and generating failure indications, whereby the automobile owner or a qualified service person can interpret the error information and perform the necessary repairs.

BRIEF DESCRIPTION OF THE DRAWINGS

Other objects, features and advantages of the present invention will become more apparent after understanding the following description of the presently preferred embodiment in conjunction with the drawings in which:

FIGS. 10 and 11 are flow charts depicting the control methodology employed to ensure proper sequencing of the various structural elements as the convertible top is retracted and extended.

DETAILED DESCRIPTION OF THE PREFERRED EMBODIMENT

Figure 1:
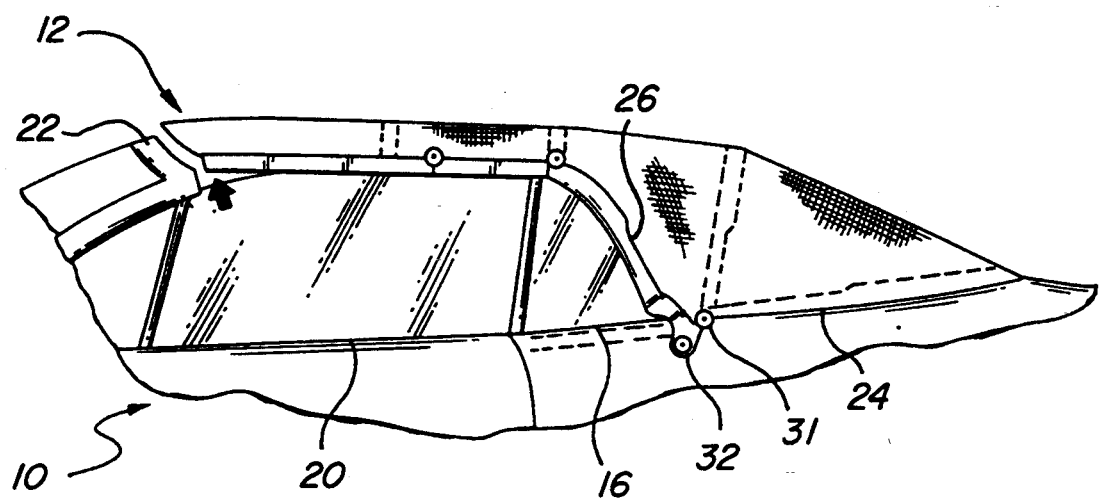
FIGS. 1 through 8 are diagrams illustrating the movement of the elements of the convertible top as it is retracted and extended.

As illustrated in FIGS. 1 through 8, the present invention is directed toward a mechanism which can automatically raise and lower an automobile convertible top. As can be appreciated by those of ordinary skill in the art, while each different type of automobile requires a different convertible top suited to the particular vehicle, the concepts disclosed herein are equally applicable to a wide variety of configurations. In the presently preferred embodiment, the portions of vehicle 10 of interest for the purposes of this discussion are the convertible top 12 which is stored in a compartment beneath a tonneau cover 14, the rear quarter windows 16 and the front side windows 20. Also, although not specifically shown in the drawings, the vehicle has a trunk lid located rearward of the tonneau cover. Generally, the tonneau cover 14 must be raised and the windows 16, 20 must be lowered before the convertible top 12 is lowered or raised. This insures that the top 12 will be properly stored in the compartment beneath the tonneau cover 14 and also insures that the windows 16, 20 are clear of the top 12 as it moves, thereby preventing damage. Similarly, the trunk lid generally should not be opened when the tonneau cover 14 is raised.

More particularly, the lowering, or retracting, of the convertible top occurs in the following manner. In this embodiment, the convertible top cannot be raised or lowered unless the vehicle is stopped. This prevents the driver from accidentally moving the top while under way, and can be accomplished several ways. One way is to determine whether the transmission shift lever is in "park," and another way involves measuring wheel speeds and/or vehicle speed to see if the speed is zero. Since the transmission shift lever position, wheel speeds and/or vehicle speed are already monitored on most cars to accomplish other functions such as engine fuel management and anti-lock braking, tapping into one or more of these signals would be fairly simple for one of ordinary skill.

With the car stopped, the first step, as shown in FIG. 1, involves unlatching the top 12 from the header 22. In this embodiment, screw motors unhook J-hooks latched to the header 22. This is disclosed in assignee's issued U.S. Pat. No. 5,058,939, the disclosure of which is hereby incorporated by reference. However, it can also be appreciated that other forms of latches could be used. Additionally, the latches could be manual, with conventional sensors to indicate whether the person operating the car has yet unlatched the latches. Next, to prevent accidental collisions between components, the trunk lock release is disabled to prevent the trunk lid from being opened into the path of the moving tonneau cover 14 and/or top stack 12. Once the latches are unlatched and the trunk release disabled, the rest of the movements necessary to lower the top 12 can commence.

Figure 2:
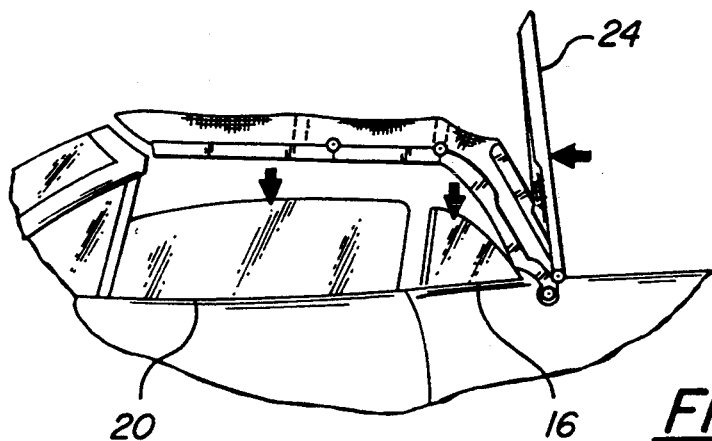

The next movement in the sequence, shown in FIG. 2, is the raising of the rear bow 24 so that the tonneau cover 14 can be raised, and the lowering of the forward side windows 20 and rear quarter windows 16. The forward side windows 20 and rear quarter windows 16 are lowered to allow the top to move freely without worry of damaging the windows 16, 20. In this embodiment, the windows have an "express down" feature which permit the windows to be lowered completely after only holding down the window control button for a few seconds. Since express down requires special circuitry to allow such a feature, the control system of the presently preferred embodiment exploits this circuitry to accomplish the automatic lowering of the windows when the convertible top is set in motion.

Figure 3:
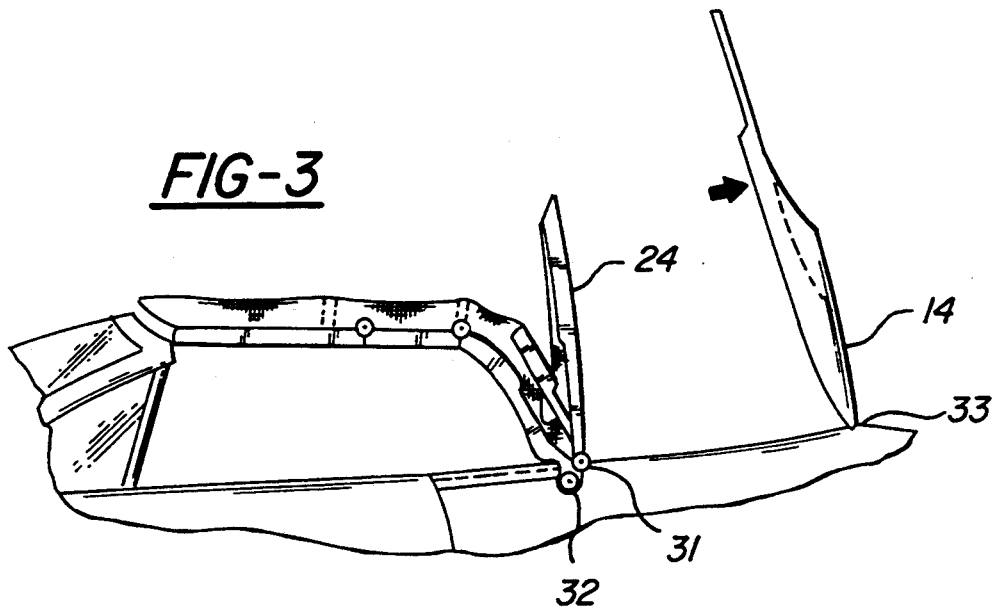
Figure 4:
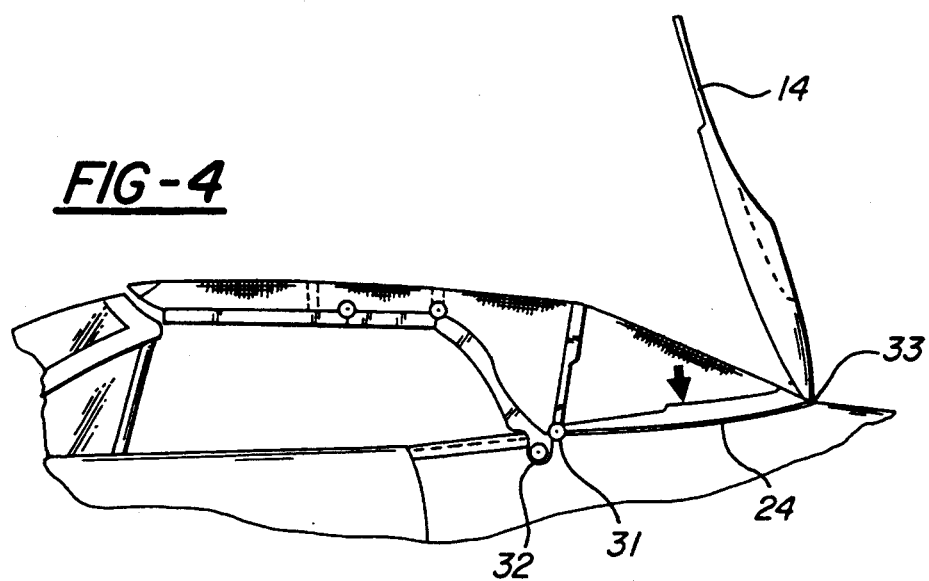
Figure 5:
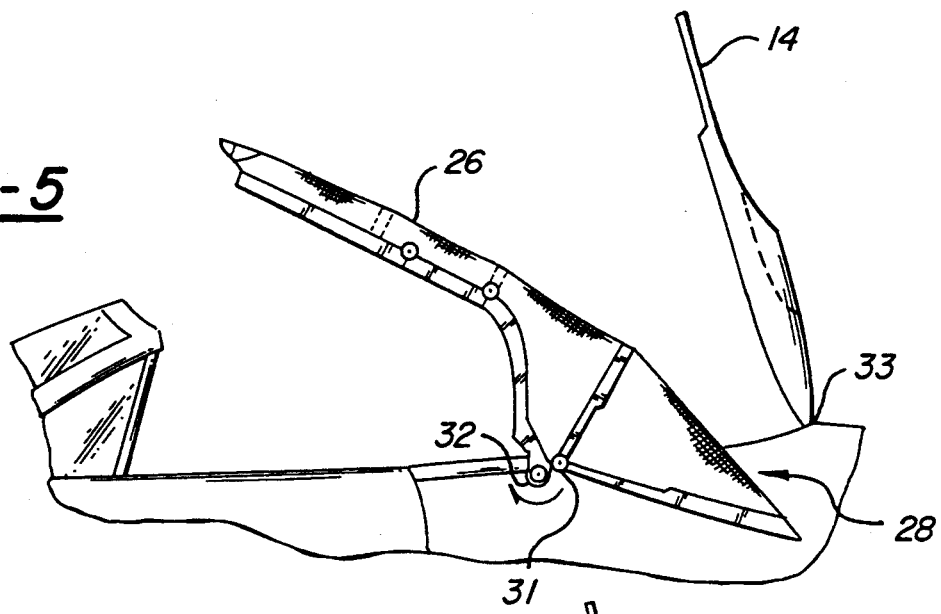
Figure 6:
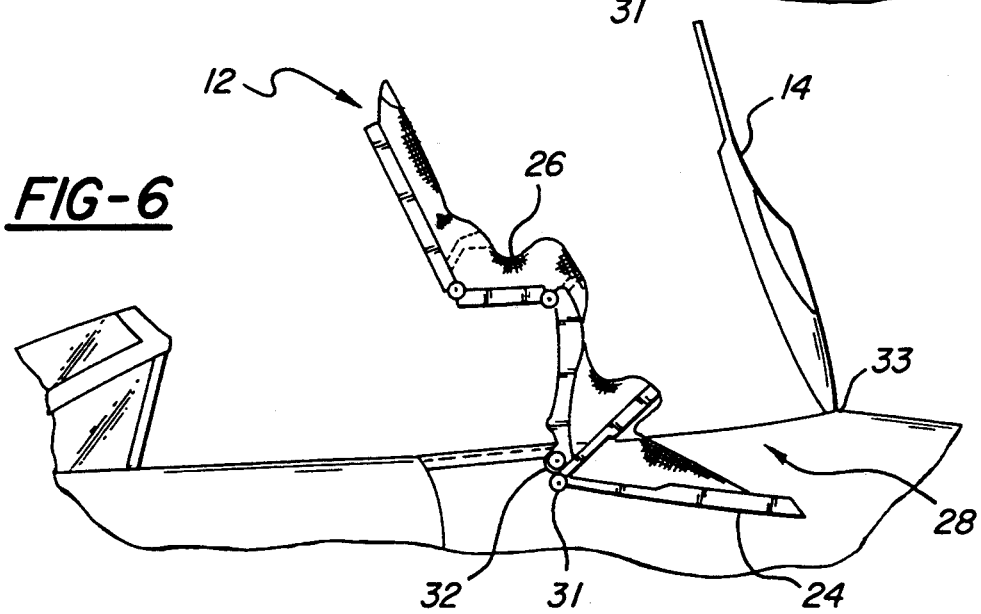
Figure 7:
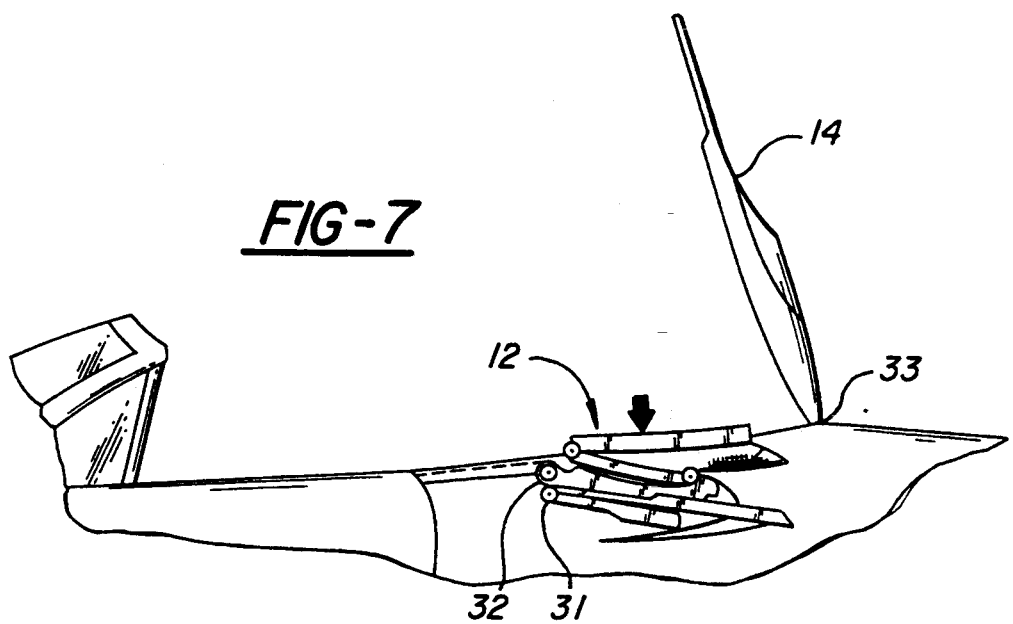
Figure 8:
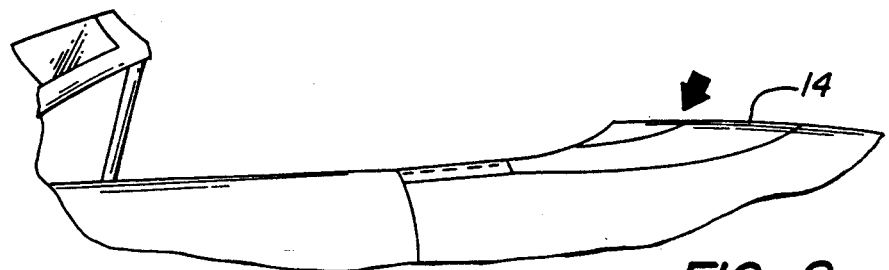

Once the rear bow 24 reaches a position clear of the sweep path of the tonneau cover 14, the tonneau cover begins raising, as shown in FIG. 3. Next, once the tonneau cover 14 reaches a position clear of the sweep path of the rear bow 24, the rear bow lowers, as shown in FIG. 4, and the main rail of the convertible top 26 begins lowering into the compartment 28 beneath the tonneau cover 14, as shown in FIGS. 5-7. Finally, once the top is retracted into the compartment 28 and is clear of the sweep path of the tonneau cover 14, as shown in FIG. 7, the tonneau cover 14 is lowered to cover the compartment 28, and the windows raised as shown in FIG. 8. To raise the convertible top 12, the sequence of movements are simply reversed. The linkages forming the support frame of the convertible top and the motors used to move the linkage can be of conventional design, such as disclosed in U.S. Pat. Nos. 3,180,675 and 3,312,058.

Figure 9:
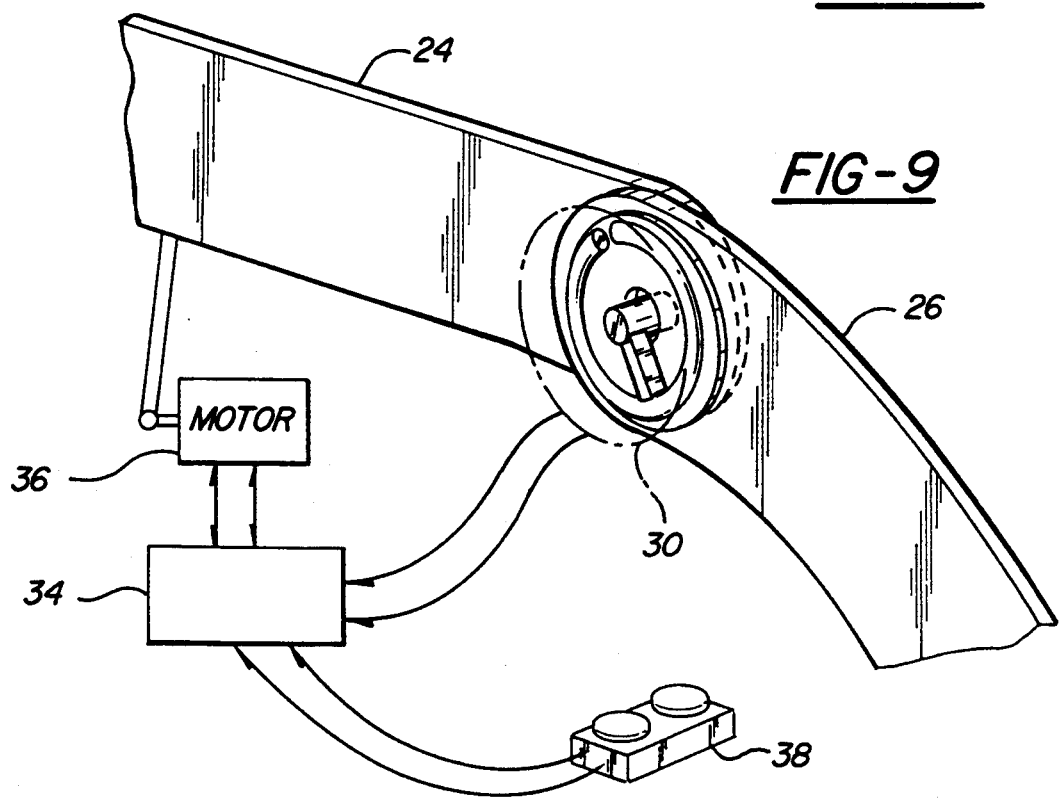
FIG. 9 is a functional diagram detailing the relationship between the motor, sensor, structural element and controller at one particular pivot point in the convertible top mechanism.

In order to provide the unique control of this invention which allows the various elements, such as the latches, rear bow 24, tonneau cover 14 and main rail 26 to move in a fluid, simultaneous fashion, a unique arrangement of sensors is provided. As illustrated in FIG. 9, each top stack position sensor in the preferred embodiment takes the form of a rotary variable resistance device or potentiometer 30 mounted at the pivot point of a pair of elements or links. When mounted at a pivot point between links, the sensor senses the relative position of one link with respect to the other. Similarly, when mounted at a pivot point between a link and the vehicle's chassis, the sensor senses the relative position of the link with respect to the chassis. It can thus be appreciated that these sensors should be provided at each critical pivot point in the mechanism. Here, Applicants have discovered that only three top stack position sensors are required to achieve full control of the top. The three critical points of relative movement requiring sensing are: 1) the position of the rear bow 24 with respect to the main rail 26; 2) the position of the main rail 26 with respect to the vehicle chassis, or body; and 3) the position of the tonneau cover 14 with respect to the vehicle body. The position sensors are mounted at these three critical pivot point 31, 32 and 33. For example, as detailed in FIG. 9, the sensor provided at the pivot point 31 of the rear bow 24 is shown diagrammatically in greater detail. Here it can be seen how the potentiometer 30 measures the relative position between the rear bow 24 and the main rail 26. The pivot point sensors are electrically connected to the controller 34 which monitors the positional information provided by the sensors (i.e. voltage or amperage) and, in response to these signals, commands the movement of the convertible top 12.

In this embodiment, cantilevered DC motors move the various elements, although it should be appreciated that other motive means could be utilized, such as, for example, hydraulic motors. However, DC motors have been selected for several reasons. First, the power draw of a DC motor is directly proportional to motor torque. This allows the loading of the motor to be monitored to protect against overburdening the motor. Second, DC motors can be manually back-driven more easily than can hydraulic mechanisms. This helps ensure manual override of the system can be effected in the event the system fails.

In order to move the tonneau cover 14, rear bow 24 and main rail 26, the movement of the DC motors is governed by the controller 34. As illustrated, the rear bow motor 36 raises and lowers the rear bow 24, and the rear bow potentiometer 30 measures the relative angular position of the rear bow 24 with respect to the main rail 26. In response to the detected position of the rear bow, as well as the positions of the other elements, the controller 34 issues commands to the rear bow motor 36 to raise or lower the rear bow 24 as needed. The other motors are similarly controlled. Likewise, the control of the windows involves the use of window drive motors and window position sensors which detect whether the windows are in the full up or full down position.

The interaction of the controller 34, DC motors, sensors and various interlocks can be better understood by referencing the flow charts of FIGS. 10 and 11. The controller 34 is powered by the vehicle's electrical system, and includes driver circuits for providing current to the motors, A/D converters for sensing the stall condition of the motors and for the instantaneous positional information provided by the potentiometers and position sensors, and command input lines for receiving and interpreting the "top up" or "top down" signals issued by the automobile driver through the up/down switches 38, all of which are interfaced to a microprocessor. It can be appreciated by those of ordinary skill in the art that the electronics and circuitry comprising the controller 34 can take a variety of forms, however the microprocessor, converters and drivers selected for this embodiment provide a convenient means by which to execute the invention.

In this embodiment, the controller 34 monitors the linkage element positional information provided by the sensors to determine the instantaneous position of the linkage elements. It also monitors sensors associated with latches, interlocks and position switches to determine positional and status information of components such as the header and rear bow latches, the trunk release solenoid, the windows and whether or not the vehicle is stopped. The controller 34 also monitors for a stall condition at the motors to determine if a motor is being unduly loaded, such as would occur if the linkage being driven by the motor were jammed. Within the logic circuitry of the microprocessor of the controller 34 are instructions for interpreting the monitored information and for directing current to the motors to drive the motors in accordance with the action desired by the automobile driver.

In this embodiment, the driver is provided with "up" and "down" buttons located on the dashboard. These directional control buttons 38 are electrically linked to the controller 34 and determine which sequence of movements of the convertible top 12 are desired. As shown in FIG. 10, the general control system logic progresses in the following manner. If the driver presses the "up" button and the top 12 is already fully raised, no action is taken, as indicated by function block 50 and action nmenomic 52. Similarly, if the "down" button is pressed while the top 12 is fully lowered, no action is taken 60, 62. However, the normal course of events would be that the "down" button is pressed when the top 12 is up, and the "up" button pressed when the top 12 is down.

It should be noted that, in this embodiment, the driver must continue to depress the "down" button for the top 12 to continue moving down, and must continue pressing the "up" button for the top to continue moving up. This allows the driver to pause or even reverse movement of the top by simply releasing the button and pressing the opposite direction. One of ordinary skill can appreciate that the driver may wish pause movement of the top to perform other tasks, or may wish to reverse movement of the top if he changes his mind about opening or closing the top.

When the top is up 50 and the "down" button is pressed, the controller 34 senses the directional command desired by the automobile driver and begins initiating the sequence of movements necessary to lower the top 12. First, provided the vehicle is stopped, the J-hooks are unlatched, the windows are lowered and the rear bow 24 is raised 70 until the positional sensors indicate that the rear bow is in the up position and the tonneau cover is in the down position 72. Provided the "down" button is still being depressed, the next action is to raise the tonneau cover 74. The positional information provided by the sensors should then be that the rear bow, main rail and tonneau cover are in the up position 76. Now that the tonneau cover is clear, the rear bow is lowered 78, leaving the main rail and tonneau cover up 80. Next, the main rail is lowered 82, leaving only the tonneau cover in the up position 84. Finally, the tonneau cover is lowered and the windows raised 86, completing the lowering 60 of the convertible top 12. Of course, as was previously disclosed, none of these movements would be allowed to take place unless the car is stopped. Likewise, the trunk release would be disabled to prevent accidental opening of the trunk during these movements.

To raise the convertible top 12, the process is simply reversed. Thus, the controller senses the "up" command issued by the automobile driver and begins the sequence of actions necessary for raising the top 12. First, the tonneau cover is raised and windows lowered 90, leaving the main rail and rear bow in the down position but the tonneau cover in the up position 84. Once the tonneau cover is clear, the main rail is raised 92 so that both the tonneau cover and main rail are in the up position 80. Next, the rear bow is raised 94 so that all elements are in the up position 76. Once the rear bow is clear of the sweep path, the tonneau cover is lowered 96, leaving the main rail and rear bow up 72. Finally, the rear bow lowers, the J-hooks latch and the windows raise 98, completing the sequence of motions necessary to raise the top.

As shown in FIG. 11, the actual logic process includes the steps of initializing the controller upon power-up 100 and resetting the logic control sequence 102. Next, the controller determines the status of the vehicle parameters, reads the position sensor and directional command switch information 104, and determines the position of the linkage elements with respect to the directional command desired 106. Based upon this information, the proper movement in the sequence of movements is selected 110 and commanded 112–124. It can be appreciated from this diagram that while each given motion sequence is executed 112–124, the controller returns to the beginning of the control logic sequence and reassesses the positional and direction information 104, 106 in order to determine 110 the next desired motion 112–124.

Since people normally only open the convertible top of an automobile when the weather is pleasant, the top may remain up and the motorized convertible top mechanism remain inactive for long periods of time, such as during the winter. Because of this, the presently preferred embodiment employs current wetting during the initialization step 100. During current wetting, a short burst of electrical current is sent through the motor driver circuitry. This short burst of current is not enough to actually energize the system and cause movement, but is rather designed to ensure the various connectors and relay contact points do not become corroded during their period of dormancy. For example, the up/down button 38, being a mechanical device, swipes away any buildup every time the driver depresses the button. However, since the connectors are rarely disengaged to inspect for and remove buildup, the current wetting pulse travelling through the connectors during each and every initialization sequence helps retard the growth of buildup. Moreover, the controller can monitor the response to the current wetting pulse to help detect circuit interruptions, such as opens or shorts, during initialization.

Also, it should be appreciated that, prior to executing a selected action 110, the controller 34 first ensures that the vehicle is stopped. Presuming that the vehicle is equipped with wheel speed sensors, the vehicle is considered stopped when the wheel speeds are all zero. Furthermore, once movement of the convertible top is undertaken and until the top reaches the fully opened (FIG. 1) or fully closed (FIG. 8) positions, the trunk lid release is disabled. This prevents the driver from accidentally releasing the trunk lid while the convertible top is in motion, and helps prevent damage to both the convertible top and the trunk lid.

The presently preferred embodiment further includes an interlock which interfaces with the automobile's alarm system. When the convertible top is either fully up or fully down, a signal indicating such is transmitted from the convertible top controller 34 to external devices, such as the auto alarm system. For example, in the presently preferred embodiment, when the convertible top controller 34 senses that the top stack is fully up, an "up" relay is latched. The latching of the relay can thereafter be monitored by external devices, such as the alarm system, so that appropriate action may be taken. In the case of an auto alarm, information as to whether the top stack is fully up or fully down may be used to affect the alarm mode. Finally, the convertible top controller 34 provides information to other vehicle controllers via the vehicle's controller bus. This allows alert messages to be displayed to the driver and enables the other vehicle controllers to modify operating characteristics as needed to accommodate the actions of the convertible top.

In practice, the control logic progresses as described in conjunction with FIG. 10, with the additional features of detecting improper linkage positioning and/or excessive motor loading, and selects the motion sequence 112-124 necessary to remedy the situation. Thus, for example, if the controller 34 is currently commanding the tonneau cover to raise 112 and a stall condition is detected at the motor driving the tonneau cover, the controller stops the motor 102 and reassesses the positional information 104 to determine if another action is required. Similarly, in the event that the tonneau cover is being raised 112 but the rear bow slips into the path of the tonneau cover, the positional information 104 will reveal this potentially damaging situation and initiate the raising of the rear bow to insure the tonneau cover has proper clearance to move. Finally, in the event that an unrecoverable error occurs, the up and down buttons can be depressed simultaneously 130 to reset the system. Upon resetting, qualified service personnel can access the controller 34 and receive error information such as whether one of the sensors has become grounded or shorted or whether one of the motors is experiencing difficulty. Thus, service can be provided more quickly and cheaply because the convertible top system is self-diagnosing.

More particularly, the error detection and logging scheme employed in the presently preferred embodiment utilizes several unique concepts. First, instantaneous position information can be utilized to allow overlapping, or simultaneous, movements. Second, the instantaneous position information can be used to determine whether the top is moving as desired or if an error has occurred. Third, the instantaneous position information allows the controller to command those precise movements necessary to achieve the fluid opening and closing of the top without risking accidental overlap collisions between elements. Finally, the instantaneous position information allows the controller to initiate remedial action in the event an overlap condition or stall condition is detected.

First, the manner in which instantaneous positions are monitored will be described in greater detail. For any two given elements, there exists a range of positions where the sweep path of the elements intersect. Outside of these ranges, the elements can move freely without worry of collision. However, within that range, care must be taken to avoid accidental collision between simultaneously moving elements. In this embodiment, the elements which have intersecting sweep paths are the rear bow and the tonneau, the main rail and the tonneau, and the main rail and header latch. Additionally, the controller should be aware of the latched state of the header and rear bow latches. For the various top stack elements, the ranges of motion can be categorized into four states: the first state corresponding to a first extreme position, the last state corresponding to the opposite extreme position, and the second and third states corresponding to the beginning and end, respectively, of the range where the element's sweep path intersects another element's sweep path. For example, as measured by the potentiometers, the lowest possible position is given a state definition of "State 0". Likewise, the upper most position is given a state definition of "State 3". When moving from low to high, the point at which overlap starts is given a state definition of "State 1" and the position where overlap ceases is given a state definition of "State 2". Using the state definitions of 0 through 3, it can be appreciated by one of ordinary skill in the art that binary coding may be used to represent these states. Thus, the low position is represented by binary code 00, the lower boundary of the overlap range represented by 01, the upper boundary of the overlap range represented by 10, and the upper most position by 11. For elements such as the windows, wheel speeds, header latch and rear bow latch, a binary code of simply 0 for down, stopped, or unlatched and 1 up, moving or for latched, respectively, will suffice. Using these state definitions, a hexadecimal status word can be formed.

The status word formed by the logic process of the presently preferred embodiment is an 8-bit word where Bit 7=header latch state
Bit 6=rear bow latch state
Bit 5,4=main rail position
Bit 3,2=rear bow position
Bit 1,0=tonneau position While it is convenient to use an 8-bit word as the status word, it can be appreciated by one of ordinary skill in the art that the order of the status bits could be changed and the number of status bits in the status word could be increased or decreased to provide information regarding other status items. For example, in an alternative embodiment, a status bit is provided to indicate whether the vehicle is stopped (0 for moving, 1 for stopped) instead of the header latch status bit.

Using a status word format, every possible combination of positions can be described as a two digit hexadecimal number. For example, with the convertible top up and the rear bow latched, the status word would read 40, or 01000000, which corresponds to Bit 7=0, header unlatched or header latched not monitored,
Bit 6=1, rear bow latch,
Bit 5,4=00, main rail fully extended,
Bit 3,2=00, rear bow fully extended,
Bit 1,0=00, tonneau fully extended.

As can be appreciated, in this example, the header latch status bit equalling 0 when the convertible top is fully up and latched would indicate that the header latch is not monitored. If the car were equipped with a header latch which was monitored, the status word would be 11000000, or C0 in hexadecimal. Using the status bit to form status words, the top down sequence, by state, can be represented as follows:

Header Latch status bit, 1=latched, 0=unlatched
Rear Bow Latch status bit, 1=latched, 0=unlatched
Main Rail Position bits, 00=top up, 11=top down, 01,10=sweep collision region
Rear Bow Position bits, 00=bow down, 11=bow up 01,10=sweep collision region
Tonneau Cover Position bits, 00=down, 11=up

| | | |
|---|---|---|
| 11000000 | C0 | top is up, header is latched and rear bow is latched |
| 01000000 | 40 | top is still up, unlatch header, leave rear bow latched |
| 00000000 | 00 | now unlatch rear bow |
| 00000100 | 04 | rear bow starts raising up and is now in overlap region |
| 00001000 | 08 | rear bow continues raising |
| 00001101 | 0D | rear bow finishes going up, while tonneau cover starts raising up |
| 00001110 | 0E | tonneau cover continues raising and is now in overlap region |
| 00011111 | 1F | tonneau finishes going up, while main rail starts to lower |
| 00101111 | 2F | main rail continues lowering and is now in overlap region |
| 00111110 | 3E | main rail finishes lowering, while tonneau cover starts to lower |
| 00111101 | 3D | tonneau cover continues lowering and is now in overlap region |
| 00111100 | 3C | top is down |
| 01111100 | 7C | top is down and tonneau cover is latched |

Similarly, the top up sequence, by state, can be represented as follows:

| | | |
|---|---|---|
| 01111100 | 7C | top is down and tonneau cover latched |
| 00111100 | 3C | unlatch tonneau cover |
| 00111101 | 3D | start raising tonneau cover |
| 00111110 | 3E | continue raising tonneau cover |
| 00101111 | 2F | finish raisins tonneau cover, while main rail starts raising |
| 00011111 | 1F | continue raising main rail |
| 00001110 | 0E | finish raising main rail, while tonneau cover begins lowering |
| 00001101 | 0D | continue lowering tonneau cover |
| 00001000 | 08 | finish lowering tonneau, while rear bow starts lowering |
| 00000100 | 04 | continue lowering rear bow |
| 00000000 | 00 | top is up |
| 10000000 | 80 | latch header |
| 11000000 | C0 | latch tonneau cover |

Using this scheme, the instantaneous position can be readily interpreted and examined to ensure undesirable overlapping collisions do not occur. Specifically, a table can be implemented in software where, for every possible combination of movements, the next proper movement can be charted. This can be better understood by referencing Chart 1, below.

| | 0x | 1x | 2x | 3x | 4x | 5x | 6x | 7x | 8x | 9x | Ax | Bx | Cx | Dx | Ex | Fx |
|---|---|---|---|---|---|---|---|---|---|---|---|---|---|---|---|---|
| x0 | dn04 up80 | | | | dn00 upC0 | | | | dn00 upC0 | | | | dn40 upXX | | | |
| x1 | ed03 | | | | | | | | | | | | | | | |
| x2 | ed03 | | | | | | | | | | | | | | | |
| x3 | ed0F | | | | | | | | | | | | | | | |
| x4 | dn08 up00 | ed18 | | | | | | | | | | | | | | |
| x5 | ed08 | | | | | | | | | | | | | | | |
| x6 | ed07 eu0A | | | | | | | | | | | | | | | |
| x7 | eu0B ed0B | | | | | | | | | | | | | | | |
| x8 | dn0D up04 | ed1D | | | | | | | | | | | | | | |
| x9 | ed0C ed08 | | | | | | | | | | | | | | | |
| xA | ed0E eu0E | | | | | | | | | | | | | | | |
| xB | ed0F eu0F | | | | | | | | | | | | | | | |
| xC | ed0F eu08 | | | dn7C up3D | | | | | dnXX up3C | | | | edRR euRR | | | |
| xD | dn0E up08 | ed1E | | dn3C up3E | | | | | | | | | | | | |
| xE | dn1F up0D | ed1F | | dn3D up2F | | | | | | | | | | | | |
| xF | ed1F eu0C | dn2F up0E | dn3E up1F | | | | | | | | | | | | | |

From the foregoing, it can be appreciated that the "dnNN" entries correspond to the next state desired when lowering the top, while the "upNN" entries correspond to the next state desired when raising the top. For example, by examining cell "1F," it can be seen that the next desired state is 2F when lowering the top and is 0E when raising the top. The dnXX and upXX entries correspond to positions which terminate the lowering and raising sequences, respectively, Thus, 7C correspond to the top being fully down, while C0 corresponds to the top being fully up and latched. While a separate error operation table may be provided, it can be appreciated that a single table can include both normal and error operations handling states. Here, a single table is employed because it conserves controller memory, which is often be a precious resource when dealing with microcomputers. These error corrective position and movements are denoted with "euNN" and "edNN", where "eu" stands for a position error detected while moving the top up, and "ed" for a position error detected while moving down.

As shown in the operation state table, for example, a state of 00001001, or 09 in hexadecimal, when the top is going down corresponds to the rear bow not having raised beyond the sweep path of the tonneau cover, while the tonneau has entered the sweep path of the rear bow. This means that a potential collision exists, or may have already occurred, between the rear bow and the tonneau cover, which is undesirable. In this instance, to correct the improper positioning, the rear bow should be raised and the tonneau cover should be lowered. Thus, the desired state found in the error operation table in cell entry 09 is ed0C, which corresponds to moving the rear bow until it is fully up and moving the tonneau cover fully down. As can be seen, for those error states from where recovery may be feasible, the next, or recovery, state is charted. Thus, the state table provide information for both normal operations and error handling operations. Also, there are position error states for which recovery should not be attempted. These are denoted as "euRR" and "edRR." For these unrecoverable states, the position information indicates that the components are so misaligned as to indicate the system has already become too misaligned to attempt recovery, or that the position detectors have become instable or have failed. In either instance, because the system should not attempt to correct the error, any state of "RR" causes a fault code to be logged. The movement and error states illustrated here were provided for the purposes of explanation, and should not be construed as constituting the entire state definition table or of constituting the only manner in which monitored positional information and desired actions can be cataloged. Moreover, the building of a state table is well within the ordinary skill in the art.

Based upon the state table definitions, the motors for the tonneau cover, rear bow, and main rail are driven either forward or backward to achieve the desired motions. For example, in cell 0E the next desired state when lowering the top is "dn1F." Consequently, the motor movements necessary to achieve "dn1F" include energizing the tonneau cover motor to continue raising the tonneau cover, and energizing the main rail motor to begin lowering the main rail. It can be appreciated that each next state command has a unique combination of motor movements necessary to achieve that state.

In addition to monitoring the instantaneous position of the various elements to detect and correct misalignments, the presently preferred embodiment also monitors the motors to detect stall conditions. Here, a stall exists whenever the motor power draw, which is proportional to motor torque, exceeds a predetermined threshold for more than a predetermined amount of time. Whether or not a motor is stalled is used by the controller in several ways. First, when the motor is moving its associated control element to an extreme position, a detected motor stall indicates that the element has reached the desired extreme position. For example, when raising the convertible top, the main rail motor rotates the main rail from the retracted to the fully extended position. As the controller commands the motor to move the main rail to the fully extended position, the instantaneous position information provided by the main rail potentiometer provides an indication of the position of the main rail. However, by including the main rail motor stall condition, the controller can, with a greater degree of certainty, conclude that the main rail has achieved the full up position. This is because when the main rail potentiometer indicates the main rail has reached the full up position, the main rail should indeed be fully up and incapable of being extended up further by the main rail motor. Therefore, the stall reading on the motor serves to confirm the positional information. In a similar fashion, a stall condition detected at a motor when the potentiometer indicates that the monitored element is at an intermediate position is an indication that a misalignment condition may exist. For example, when lowering the convertible top, the rear bow must move up and out of the way before the tonneau cover can be raised to expose the boot well. Therefore, the detection of a stall condition on the tonneau cover motor when the tonneau cover is at an intermediate position serves to confirm the positional information from the rear bow indicating that it is also at an intermediate position and has collided with the tonneau cover. Moreover, the detected stall conditions on the motors is used to generate error logging information when, despite attempts to initiate remedial action to correct a misalignment, the controller detects that the motor remains stalled nonetheless. Such a situation indicates that remedial action will not be successful, and that the convertible top has either become misaligned or one of the linkage points has become jammed so that the convertible top can no longer be reliably retracted and extended automatically. Finally, the motor stall condition can be used as a calibration variable. In this mode, a particular convertible top element is cycled between the fully extended and fully retracted positions. By determining the potentiometer position information corresponding to the positions where the motor stalls, the controller can calibrate the potentiometer position value information corresponding to the element's extreme positions. Employing this calibration feature reduces the need for the potentiometer to be precisely placed during assembly, instead allowing the controller to adapt to the particular characteristics of the convertible top system.

In the event an abnormal position is sensed from which recovery should not be attempted or from which recovery was attempted but was unsuccessful, the controller generates error logging information. The error logging information is stored by the controller so that service personnel can interrogate the controller regarding the error, which assists the service technician in pinpointing the problem. In this embodiment, the error logging information is prioritized according to the rank of the error. More serious errors are given a higher rank than less serious errors. However, errors, regardless of rank, which occur during the operation of the convertible top over time are logged in memory so that service personal may interrogate the information to provide accurate diagnosis of potential or existing difficulties. Specifically, when an error is detected, the error is assigned a rank. Next, the controller interrogates the error logging information to determine if that error has been previously logged. If the fault has not been previously logged, a counter associated with that fault is incremented but the fault is not yet technically logged. This feature avoids the logging of an error condition when the error was the result of an aberration rather than an actual error condition. Therefore, only once an error is detected and its error counter indicates that it has already occurred at least once before the error is logged.

The controller stores error logging information in non-volatile memory, allowing the error information to be retained between ignition cycles. Therefore, the error log may include information about errors which have occurred days, weeks, or even months earlier. However, as in the case of all memory devices, the memory in which the error logging information is stored is limited. Therefore, as one of ordinary skill in the art can appreciate, once the error logging buffer becomes filled, the controller must decide between deleting old error information or failing to record the current information. In this embodiment, in the event the error log buffer becomes filled, lower rank errors are deleted in favor of storing higher ranked errors. To further conserve the error logging memory, the presently preferred embodiment does not permit the logging of a low rank error condition unless it has occurred at least two more times after it is first detected. This is in contrast to the logging of higher rank errors, which are logged on the first subsequent occurrence after the error has been detected. The logging of higher and lower rank error codes are further prioritized by the assigning of error occurrence counts. As was just discussed, the error log buffer has only a limited amount of space in which to record error information. Therefore, an error log counter is provided which counts the number of error codes logged in the memory. For lower rank errors, the error log counter is incremented by one. However, for higher ranked errors, the error log counter is incremented by ten for each occurrence logged. In this manner, higher rank errors effectively "fill-up" the error log more quickly than less serious errors. By way of example, assuming the error log can retain information on up to 255 error codes, incrementing the error log counter by 10 every time a high rank error occurs means that the error log counter will indicate the error log buffer is full once 25 high rank errors have been logged. In contrast, it would take 255 lower rank errors for the error log counter to indicate the error log has been filled-up. As such, once the error log buffer begins filling up, and as lower rank errors are deleted from the list in favor of higher rank errors, the error log buffer will eventually log only the most serious of errors. This discrimination process increases the likelihood that the service technician will diagnose and remedy the more serious errors, rather than being distracted by information regarding the less serious errors. In practice, it has generally been found that later occurrences of higher rank errors provide more accurate fault diagnosis information than early occurrences of less serious errors.

The foregoing description of the presently preferred embodiment has been provided for the purposes of illustration. Therefore, one of ordinary skill in the art can appreciate that modifications could be made without departing from the spirit or scope of the invention disclosed herein.

We claim:

1. A control system for a vehicle having a convertible top comprising a plurality of articulating support members and a tonneau cover, said control system comprising:

a plurality of motive means for moving said support members and said tonneau cover to open and close said convertible top;

a plurality of sensing means connected to certain of said support members and to said tonneau cover for sensing the position of said members and said tonneau cover throughout their range of motion; and control means for interpreting said sensed positions and for commanding said motive means to move said members and said tonneau cover in accordance with predetermined movements based upon said interpreted sensed positions, said control means further adapted for logging errors whenever said members and said tonneau cover do not move in accordance with said predetermined movements.

2. A control system set forth in claim 1 wherein said predetermined movements comprise a series of sequential movements, wherein each movement of said series movements is adapted to prevent said members and said tonneau cover from colliding with one another, and wherein when said interpreted sensed positions indicate a collision is imminent, said control means commands said motive means to move said members and said tonneau cover to corrective positions where no collision is possible.

3. A control system as set forth in claim 2 wherein, after said control means has commanded said motive means to move said members and said control cover to one of said corrective positions and said interpreted sensed positions indicate said members and said tonneau sever have not reached said corrective position, said control means logs misalignment error.

4. A control system as set forth in claim 2 wherein said control means is further adapted to measure the torque loading of said motive means, and wherein said control means commands said motive means to cease movement of said convertible top when said interpreted sensed positions indicate said convertible top is in a fully extended position when said control system was moving said convertible top from a retracted to an extended position and said measured torque exceeds a predetermined torque for a predetermined length of time, and wherein said control means commands said motive means to cease movement of said convertible top when said interpreted sensed positions indicate said convertible top is in a fully retracted position when said control system was moving said convertible top from said extended position to said retracted position and said measured torque exceeds said predetermined torque for said predetermined length of time.

5. A control means as set forth in claim 4 wherein said control means logs an overload error whenever said measured torque exceeds said predetermined torque for said predetermined length of time and said interpreted sensed positions indicate said convertible top is not in said fully extended position or said fully retracted position.

6. A method for commanding movement of a convertible top and for monitoring positional information of said convertible top as it is extended and retracted, said method comprising:
  determining the desired direction of motion as being either extend or retract;
  determining the position of said convertible top;
  commanding said convertible top to move toward said extended position when said desired direction of motion is extend and commanding said convertible top to move toward said retracted position when said desired direction of motion is retract;
  commanding said convertible top to cease moving when said determined position indicates said convertible top is in said extended position and said convertible top was being commanded to move toward said extended position, and commanding said convertible top to cease moving when said determined position indicates said convertible top is in said retracted position and said convertible top was being commanded to move toward said retracted position;
  commanding said convertible top to move toward neutral positions when said determined position indicates said convertible top is not moving toward said extended or said retracted position in accordance with predetermined normal positions; and
  logging errors whenever said determined position indicates said convertible top cannot move toward said extended position when being commanded to move toward said extended position and when said determined position indicates said convertible top cannot move toward said retracted position when being commanded to move toward said retracted position.

7. A method as set forth in claim 6 wherein said method further comprises:
  monitoring the torque exerted when moving said convertible top;
  commanding said convertible top to cease moving when said determined position indicates said convertible top is in said extended position and said monitored torque exceeds a predetermined threshold for a predetermined length of time and said convertible top was being commanded to move toward said extended position, and commanding said convertible top to cease moving when said determined position indicates said convertible top is in said retracted position and said monitored torque exceeds said predetermined threshold for said predetermined length of time and said convertible top was being commanded to move toward said retracted position; and
  logging errors whenever said monitored torque exceeds said predetermined threshold for said predetermined length of time and said determined position indicates said convertible top is not in said extended or retracted position.

8. A control system as set forth in claim 1 wherein said control means inhibits said convertible top from raising or lowering if said vehicle is moving.

9. A control system as set forth in claim 8 wherein said control means monitors a transmission shift lever to determine if said vehicle is moving.

10. A control system as set forth in claim 8 wherein said control means monitors wheel speed to determine if said vehicle is moving.

11. A control system as set forth in claim 1 wherein said control means inhibits a trunk lid of said vehicle from opening when said convertible top is raising or lowering.

12. A control system as set forth in claim 11 wherein said control means inhibits said trunk lid from opening by disabling a power trunk release.

13. A control system as set forth in claim 1 wherein at least one window of said vehicle is automatically lowered by said control means when said convertible top is set in motion.

14. A control system as set forth in claim 1 wherein said plurality of motive means includes a plurality of DC motors, wherein said plurality of DC motors can be manually back driven in the event of an electrical system failure.

15. A control system as set forth in claim 1 wherein said control means employs a current wetting scheme during power-up of said control means, said current wetting scheme providing a short burst of electrical current through said motive means to ensure that connectors and relay contact points of said motive means do not become corroded.

16. A control system as set forth in claim 1 wherein said control means transmits a status signal to an alarm system of said vehicle indicating whether said convertible top is up or down.

17. A method as set forth in claim 6 wherein said method further comprises:
  determining whether a vehicle containing said convertible top is moving; and
  inhibiting said convertible top from raising or lowering if said vehicle is moving.

18. A method as set forth in claim 17 wherein said method further comprises inhibiting a trunk lid of said vehicle from opening when said convertible top is raising or lowering.

19. A method as set forth in claim 18 wherein said method further comprises:
  providing a short burst of electrical current through a motive means to ensure that connectors and relay contact points of said motive means do not become corroded.

20. A control system for lowering and raising a convertible top in a vehicle, said control system comprising:
  a plurality of motive means for raising and lowering said convertible top;
  a plurality of sensing means connected to said convertible top and to said vehicle for sensing the position of said convertible top throughout its range of motion and the speed of said vehicle;
  control means for interpreting said sensed positions of said convertible top and said vehicle speed, wherein said control means commands said motive means to move said convertible top in accordance with predetermined movements based upon said sensed positions if the speed of said vehicle is zero, said predetermined movements including a series of sequential movements, wherein each sequential movement of said series is adapted to prevent members of said convertible top from colliding with one another, and wherein when said sensed positions indicate a collision is imminent, said control means commands said motive means to move members of said convertible top to corrective positions where no collision is possible.

21. A control system as set forth in claim 20 wherein said convertible top includes a plurality of articulating support members and a tonneau cover member.

22. A control system as set forth in claim 20 wherein said control means is further adapted for logging errors whenever members of said convertible top do not move in accordance with said predetermined movements.

23. A control system as set forth in claim 20 wherein said control means is further adapted to measure the torque loading of said motive means, and wherein said control means commands said motive means to cease movement of said convertible top when said sensed positions indicate said convertible top is in a fully extended position when said control system was moving said convertible top from a retracted to an extended position and said measured torque exceeds a predetermined torque for a predetermined length of time, and wherein said control means commands said motive means to cease movement of said convertible top when said sensed positions indicate said convertible top is in a fully retracted position when said control system was moving said convertible top from said extended position to said retracted position and said measured torque exceeds said predetermined torque for said predetermined length of time.

* * * * *

UNITED STATES PATENT AND TRADEMARK OFFICE
CERTIFICATE OF CORRECTION

Page 1 of 2

PATENT NO. : 5,451,849
DATED : September 19, 1995
INVENTOR(S) : Michael A. Porter et al It is certified that error appears in the above-indentified patent and that said Letters Patent is hereby corrected as shown below:

Column 1, line 41, before "be" insert -- to --.

Column 4, line 43, "point" should be -- points --.

Column 5, line 19, before "the" insert -- receiving --.

Column 5, line 57, "nmenonic" should be -- mnemonic --.

Column 6, line 2, after "wish" insert -- to --.

Column 9, after line 33, insert -- 01, 10 = sweep collision region --.

Column 10, line 22, "raisins" should be -- raising --.

Columns 9, 10, in the Chart, line 17, "ed" should be -- eu --.

Column 11, line 9, "," (second occurrence) should be -- . --.

UNITED STATES PATENT AND TRADEMARK OFFICE
CERTIFICATE OF CORRECTION

PATENT NO. : 5,451,849
DATED : September 19, 1995
INVENTOR(S) : Michael A. Porter et al It is certified that error appears in the above-identified patent and that said Letters Patent is hereby corrected as shown below:

Column 11, line 16, delete "be".

Column 14, line 32, after "series" insert -- of --.

Column 14, line 42, "control" should be -- tonneau --.

Column 14, line 45, "sever" should be -- cover --.

Column 14, line 46, after "logs" insert -- a --.

Signed and Sealed this

Fourth Day of June, 1996

*Attest:*

BRUCE LEHMAN

*Attesting Officer*     *Commissioner of Patents and Trademarks*